Sept. 8, 1970  E. E. ALMS ET AL  3,526,969
BATCH TYPE GRAIN DRYER WITH SEPARATE DRYING AND COOLING BINS
Original Filed Jan. 26, 1968  7 Sheets-Sheet 1

INVENTORS
Erhard E. Alms &
James E. Mitchell

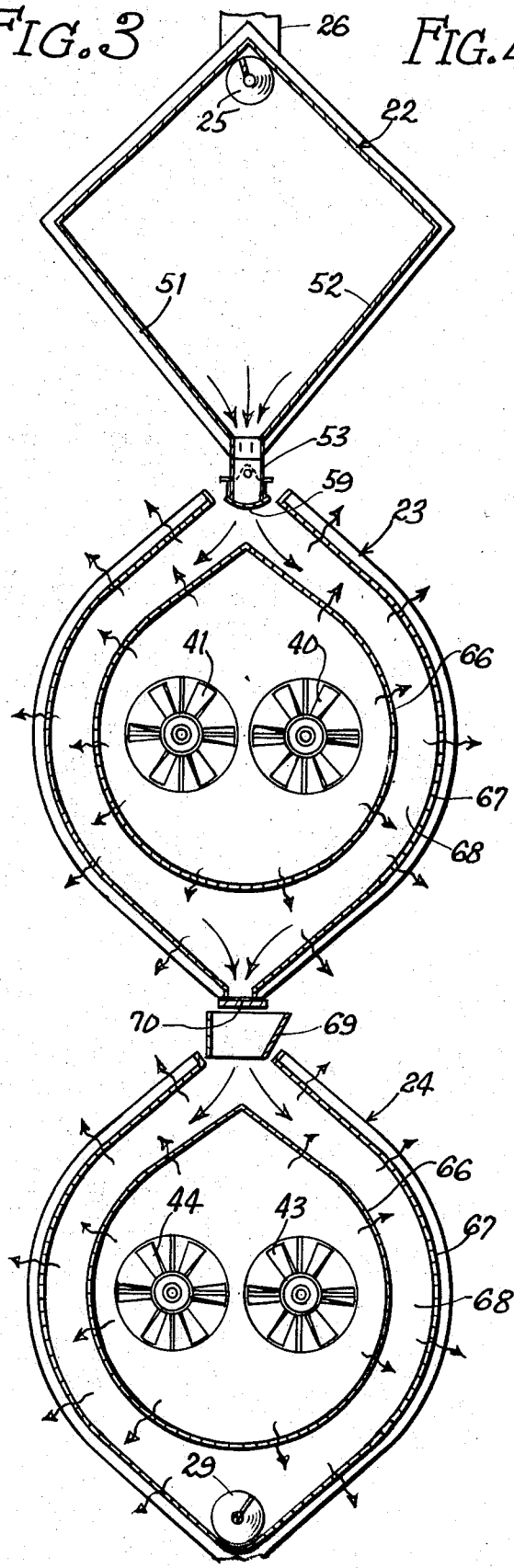
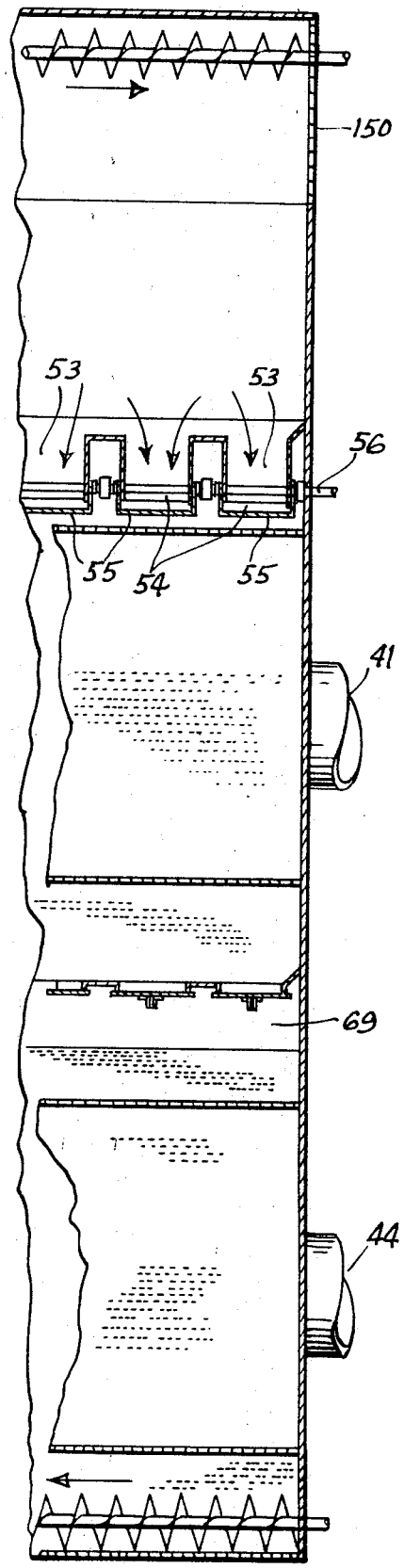

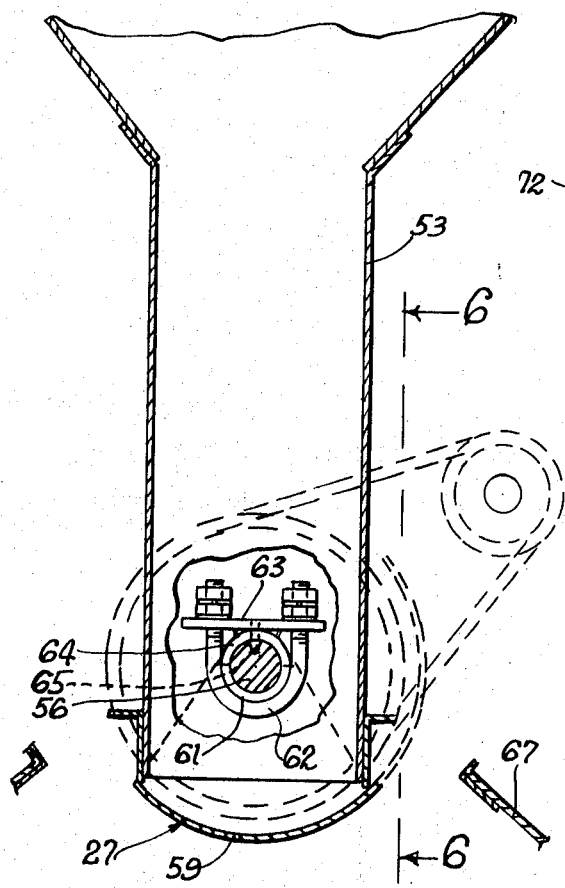
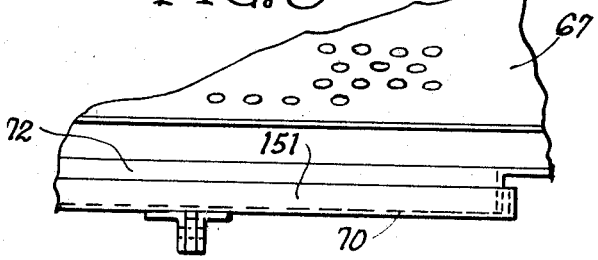
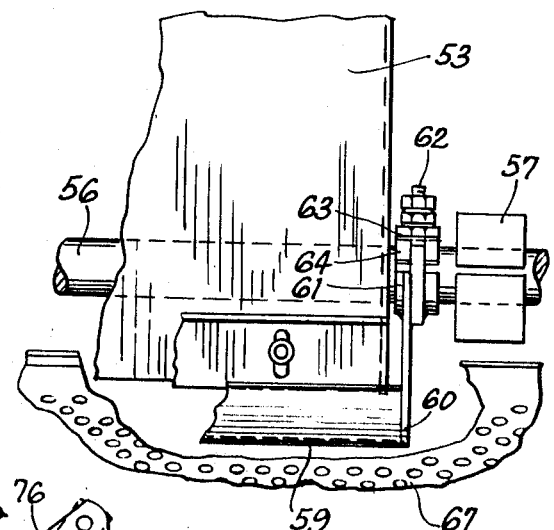
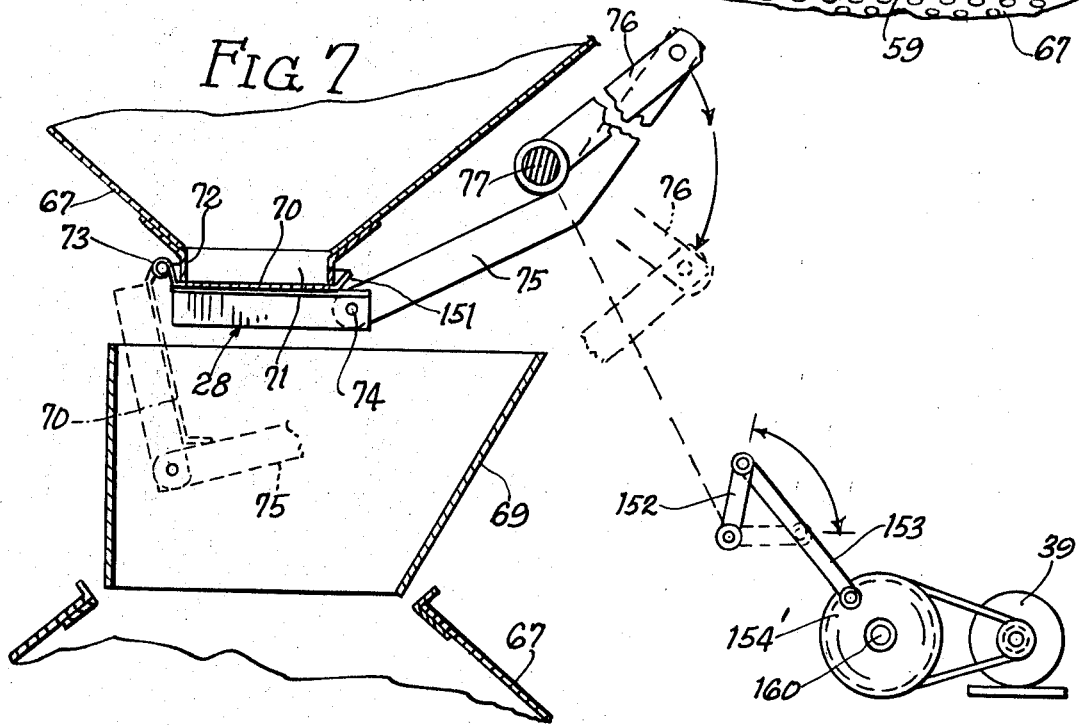

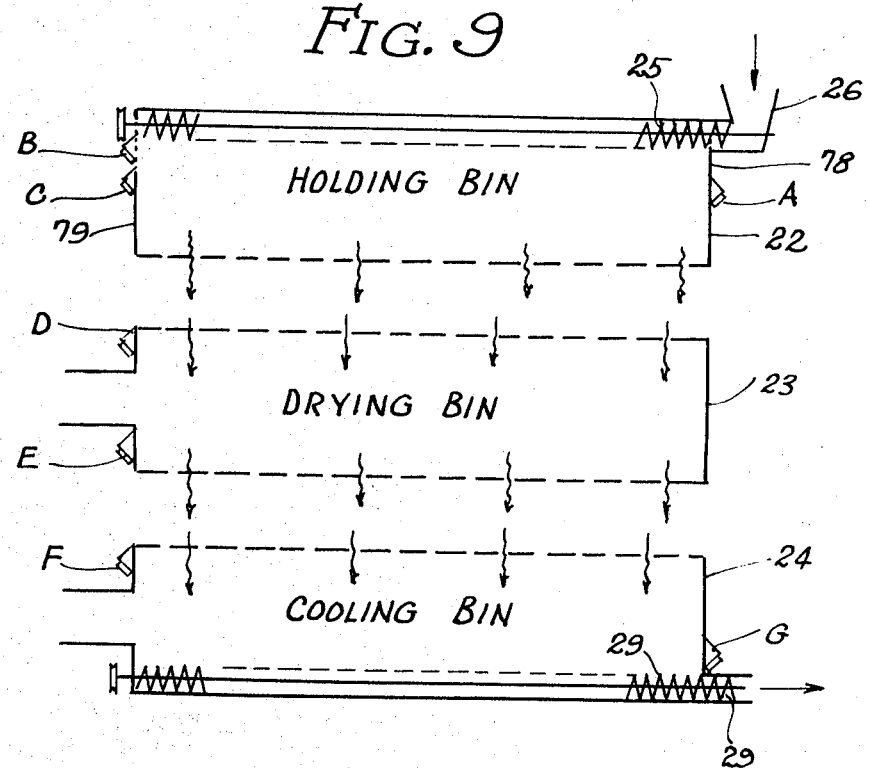
FIG. 9
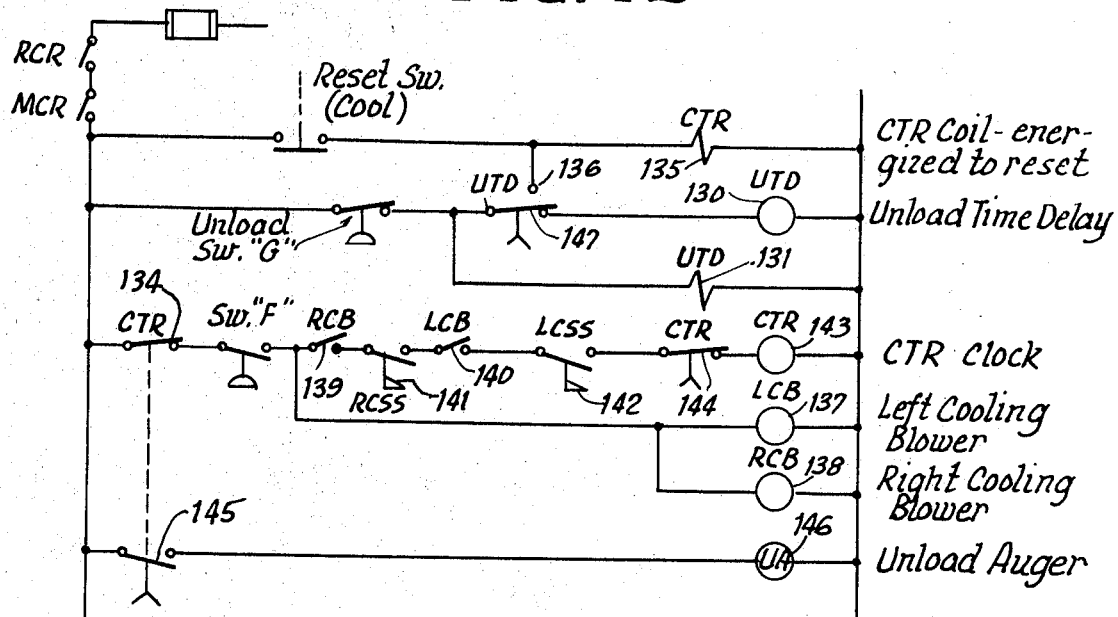
FIG. 12
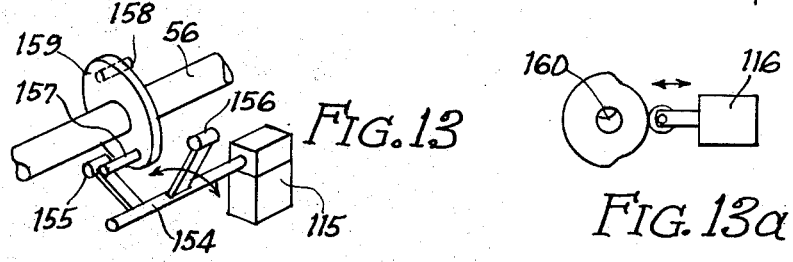
FIG. 13
FIG. 13a

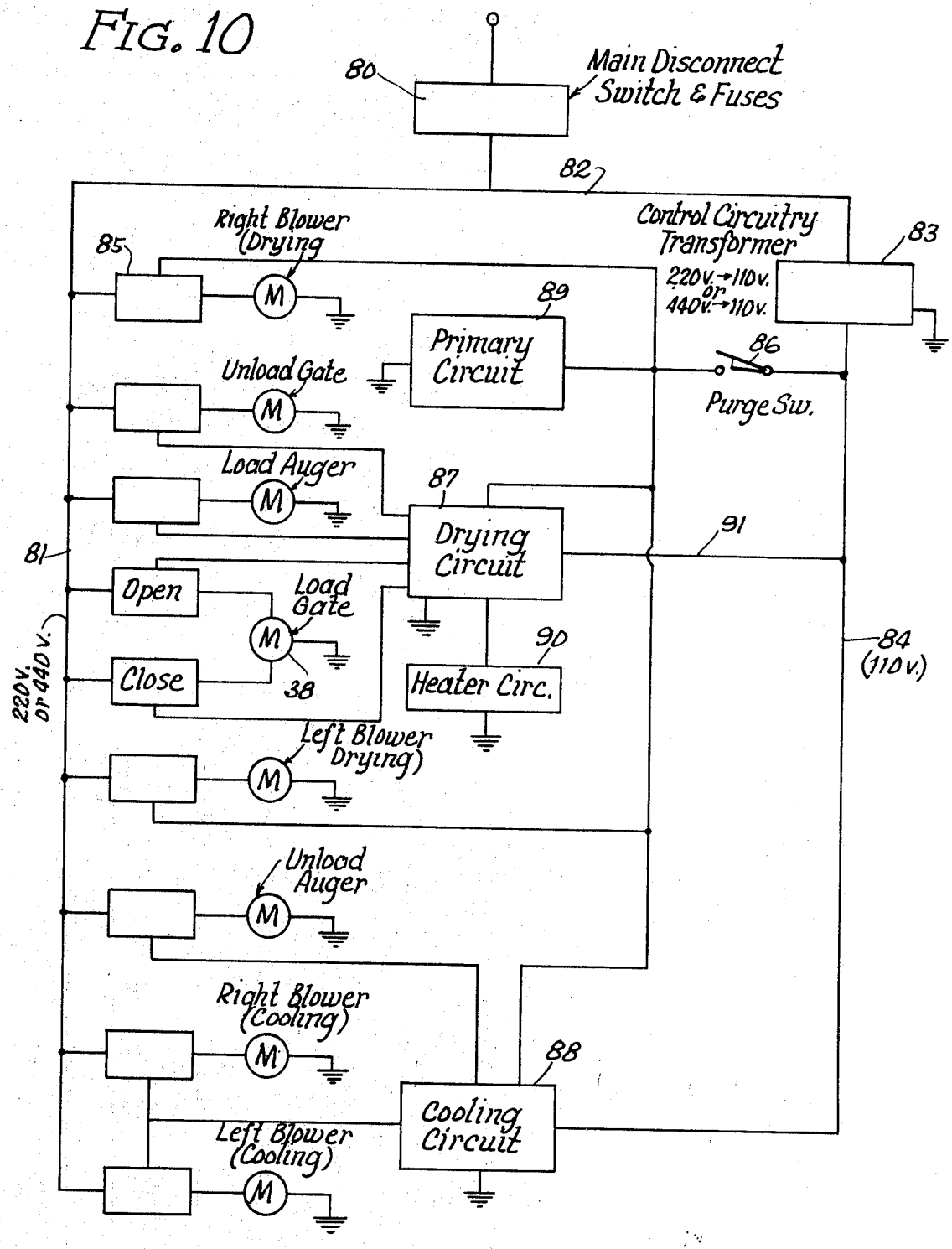

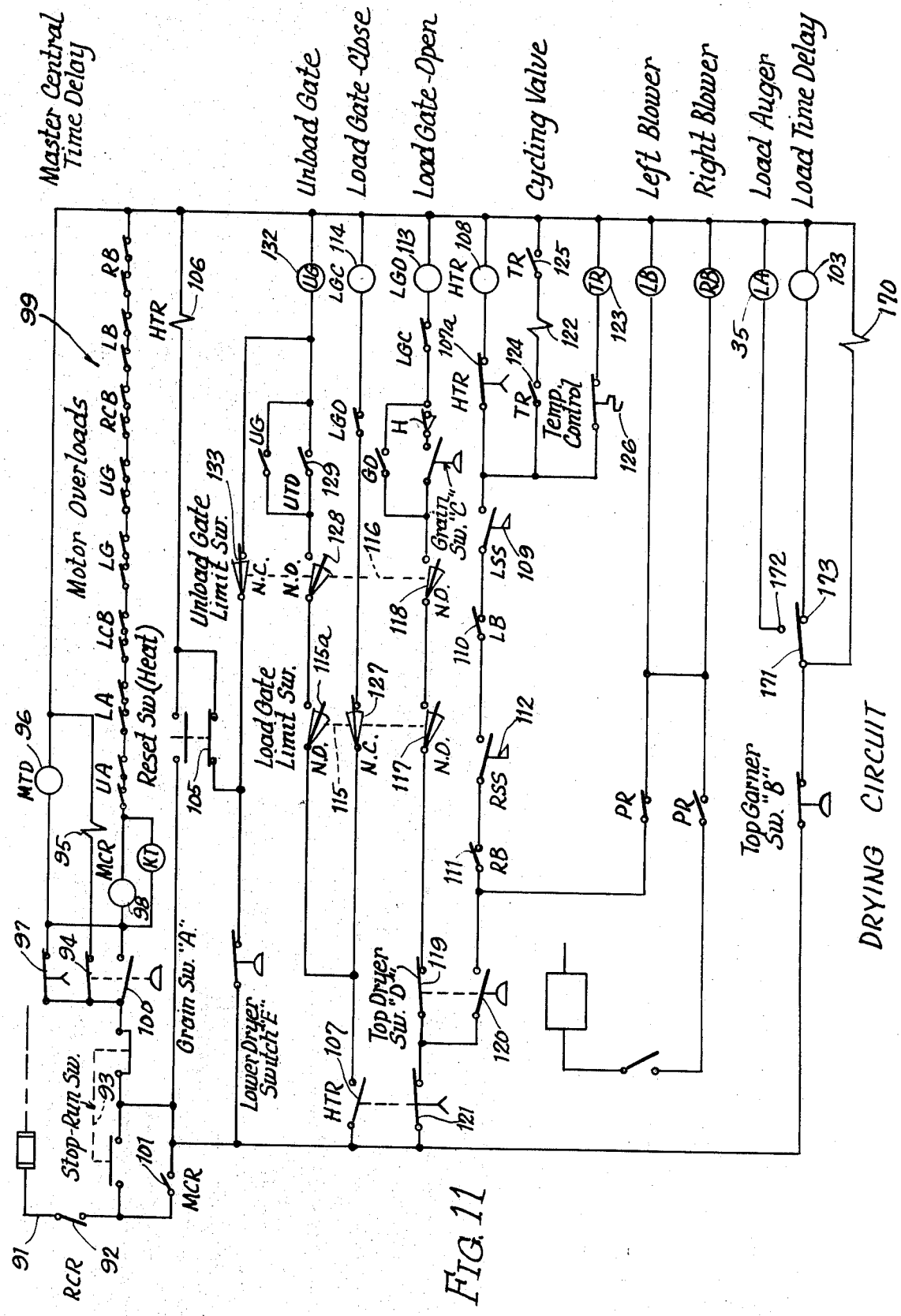

United States Patent Office

3,526,969
Patented Sept. 8, 1970

---

3,526,969
BATCH TYPE GRAIN DRYER WITH SEPARATE
DRYING AND COOLING BINS
Erhard E. Alms, Barrington, and James E. Mitchell, Cary,
Ill., assignors to American Farm Equipment Co., Lake
Zurich, Ill., a corporation of Delaware
Continuation of application Ser. No. 700,877, Jan. 26,
1968. This application Sept. 12, 1969, Ser. No. 858,570
Int. Cl. F26b 13/10
U.S. Cl. 34—56          16 Claims

ABSTRACT OF THE DISCLOSURE

A batch type grain dryer in which the drying and subsequent cooling operations are conducted in separate chambers arranged one above the other, with gravity feed, from a main holding chamber above the drying chamber into the drying chamber, and gravity feed from the drying chamber to the cooling chamber. An auger feeds the grain horizontally into the holding chamber and another auger takes the grain from the cooling chamber to the exterior of the cooling chamber with electrical grain-operated interlocks for the grain-moving mechanisms to prevent operation of any one function until the preceding grain moving function has been completed.

---

This application is a continuation of Ser. No. 700,877, dated Jan. 26, 1968.

This invention relates to crop dryers of the type disclosed in A. Andersen, U.S. Pat. No. 3,056,214, dated Oct. 2, 1962, wherein a batch of grain is exposed to hot, dry air in a perforated double-walled bin for a period of time, after which it is cooled in the same bin and then removed from the bin.

In batch type grain dryers presently available, the drying operation is halted while the bin of the dryer is being filled with grain, and is again halted while the dried grain in the bin is cooled to ambient temperature and then emptied. The quantity of grain processed per unit time is dependent upon the elapsed time of a complete cycle including filling, drying, cooling and emptying of a bin. This quantity can only be increased either by increasing the number of dryers, or increasing the capacity of each dryer.

The principal object of this invention is to provide a batch type grain dryer in which the quantity of grain processed per unit time is limited only by the time required to fill, dry and empty the drying bin, the filling and emptying being done rapidly by gravity.

Another object of this invention is to provide a grain dryer of the batch type in which the temperature of the drying bin remains substantially constant throughout the entire processing of a batch, thereby reducing the quantity of heat required per drying cycle.

Another object of this invention is the provision of a garnering or holding bin for a batch of grain to be dried, with gravity means controlled by a fast-operating dump gate to transfer the entire batch to a drying bin.

As a more specific object, this invention seeks to provide a batch type grain dryer in which the drying and cooling functions are performed in separate bins located one above the other, with fast-operating gravity means for transferring a batch of grain from one bin to the other, such that one bin performs only the drying function and the other bin performs only the cooling function.

A further specific object of this invention is to provide a batch type grain dryer in which a garnering bin is provided for collecting a batch of grain, and a cooling bin is provided below the drying bin for cooling the dried grain, with fast-operating gate means above and below the drying bin for transferring a batch of grain from the drying bin to the cooling bin and from the garnering bin to the drying bin.

Yet another specific object of this invention is the provision of separate grain hold, drying and cooling bins, with means for transferring grain into and out of said bins, and other means, sensitive to the presence of grain at predetermined locations in the bins for interlocking the operation of the transferring means so that grain will not be transferred into a bin that is already full.

Other specific objects include the provision of load and unload gates between holding, drying and cooling bins, in which the gates are so formed and located as to insure a desired grain level in the drying bin and/or desired static pressure in the drying chamber to produce uniform drying of the grain.

In its preferred form, tihs invention comprises a grain dryer of the batch type wherein the drying and cooling of the grain are performed in separate bins disposed one above the other to decrease the time required to process a batch of grain. A third or garner bin, located above the drying bin, receives the grain to be dried from an auger, a load gate between the garner and drying bins dumps the grain into the drying bin, an unload gate between the drying bin and the cooling bin dumps the dried batch into the cooling bin, and an unload auger takes the cooled grain out of the cooling bin. The operation of the augers, the load gate and the dump gate, is performed by electric motors, the controls for which are electromagnetically operated switches connected together in a control circuit which includes grain-operated pressure switches to interlock the operation of the motors so that the functions of the motors are carried out in predetermined sequence. The drying and cooling bins may be adapted from a commercially available grain dryer, the drying bin heating unit being cycled as before, but the cooling cycle being omitted, and the cooling bin omitting the heating unit and its controls entirely. All of the bins are mounted on a frame which is erected on the site where the dryer is to be used.

In the drawings, which show a preferred embodiment of the invention,

FIG. 3 is an end elevational view on an enlarged scale of the holding, drying and cooling bins and the connecting loading and unloading gates;

FIG. 4 is a fragmentary side elevational view of the bins, etc. of FIG. 3 looking from the left of that figure;

FIG. 5 is a still further enlarged end elevational view of the load gate located between the holding and drying bins;

FIG. 6 is a fragmentary side elevation of the load gate of FIG. 5 looking in the direction of arrows 6—6 therein;

FIG. 7 is a similarly still further enlarged end elevational view of the unload gate located between the drying and cooling bins;

FIG. 8 is a fragmentary side elevational view of the unload gate of FIG. 7;

FIG. 9 is a schematic diagram of the bins showing the location of grain-operated pressure switches used in the control circuit of the combined bins to interlock the operations of gates and augers;

FIG. 10 is a schematic diagram of the overall circuitry for the bins;

FIGS. 11 and 12 are control circuit diagrams for the dryer and cooler bins respectively;

FIGS. 13 and 13a are schematic showings of limit switches included in the diagrams of FIGS. 11 and 12.

Figures 1, 2:
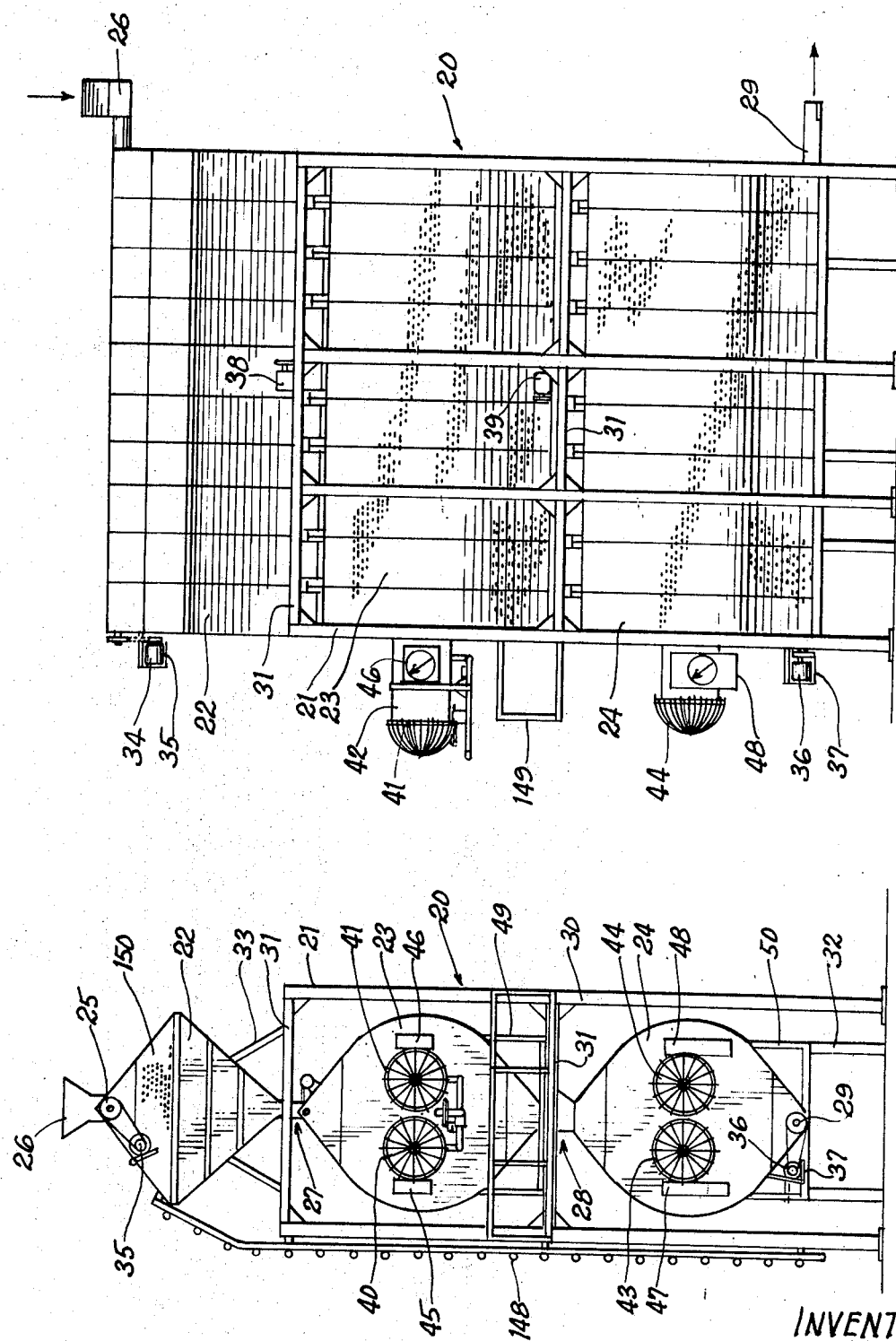
FIG. 1 is an end elevational view of the complete grain dryer.
FIG. 2 is a side elevational view of the dryer of FIG. 1.

Referring now to the drawings for a detailed description of the invention, and particularly to FIGS. 1 and 2, the reference numeral 20 refers to the assembly as a whole which is sometimes termed hereinafter the "dryer." Said assembly is comprised of a frame 21 erected on the site where the dryer is to be used and adapted to support a garnering or holding bin 22, a drying bin 23, and a cooling bin 24 disposed one below the other, such that grain in holding bin 22 may fall into drying bin 23, and may fall from the drying bin into the cooling bin 24. Grain to be dried is conveyed by an auger 25 from a hopper or chute 26 to holding bin 22. When the holding bin is full and drying bin 23 is empty, the grain is allowed to fall from the holding bin through a motor-operated loading gate 27 into the drying bin 23. The grain, after it is dried, is then allowed to fall through a motor-operated unloading gate 28 into cooling bin 24, from which it is ultimately extracted by an unloading auger 29.

Frame 21 is comprised of vertical and horizontal structural steel members 30 and 31 appropriately secured together to provide platforms on which drying bin 23 and holding bin 22 may be mounted. Cooling bin 24 is supported on its own stand 32, which may be entirely independent of frame 20. Holding bin 22 may have appropriate supporting struts 33 to hold it in position on frame 20.

A driving motor 34, belt-connected to load auger 25 is mounted on a bracket 35 supported on holding bin 22, and a similar driving motor 36, belt-connected to unload auger 29 is mounted on a bracket 37 supported on cooling bin 24. Motors 38 and 39 (FIG. 2) are mounted on holding bin 22 and drying bin 23, respectively, and serve to operate the load gate and unload gate, respectively. Said motors 38 and 39 may be located at any point on the dryer where access to them for servicing can be readily had. Left and right drying blowers 40 and 41 respectively, and their burner sections 42 are mounted on the end of drying bin 23, and left and right cooling blowers 43 and 44, respectively, are mounted on the end of cooling bin 24. The controls for each blower are contained in cabinets 45, 46, 47, 48 mounted adjacent each blower. The blowers and burners for the drying bin may be out of reach for an operator standing on the ground and hence access ladder 148 and platform 149 are provided; however, the starting and purging controls for the drying bin may be also located in the lower cabinets 47 and 48.

The drying and cooling bins 23 and 24 may be identical in size and construction and may be provided with their own stands 49 and 50, respectively.

The bins, gates and augers are shown in greater detail in the cross-sectional and side views thereof in FIGS. 3 and 4. Holding bin 22 is a single-walled bin made of flat sheets of galvanized sheets, an upper portion 150 of both bin end-walls being perforated galvanized sheet to provide ventilation and allow air to leave or enter the bin as it is filled or emptied. The sides and top are arranged to form a diamond-shaped cross-section to provide downwardly sloping walls 51, 52, converging upon a series of aligned rectangular vertically disposed chutes 53 having open ends 54 projecting into the drying bin 23 below. Said open ends 54 are closed by a series of closely spaced oscillatable load gates 55 fixed to a common shaft 56 adapted to be oscillated by motor 38. Suitable bearings 57 disposed between chutes 53 support shaft 56 from a plate (not shown) appropriately mounted on frame 20.

Each oscillatable load gate is comprised (FIGS. 5 and 6) of a cylindrically curved sheet 59 secured by welding or the like to sector-shaped plates 60 welded to a lower semi-cylindrical clamp element 61. A U-bolt 62 is also welded to lower clamp element 61 and the ends of the U-bolt extend through appropriate openings in a plate 63 forming part of the upper semi-cylindrical clamp element 64. Said clamp elements 61 and 64 serve to fix the load gates to shaft 56. To insure proper phase relation between the clamps 61, 64 and the shaft 56 which operates the gates, the shaft may be keyed, as at 65, to clamp 64. Motor 38, which oscillates shaft 56 and its associated gates 59, is of the reversible type, so that gates 59 may be swung from a closed position, shown in FIGS. 3 and 5, to an open position shown in dotted outline at 66 in FIG. 5 and back again.

Drying bin 23 and cooling bin 24 are preferably identical and are comprised (FIG. 3) of perforated inner and outer walls 66 and 67 to provide a substantially annular chamber 68 in which grain is held while it is heated to dry, or is cooled. Air is blown into the inner wall 66 by the fans 40, 41 or 43, 44 and then out through perforated inner wall 66, annular chamber 68, and perforated outer wall 67. In bin 23 the circulated air is heated to dry the grain, and in bin 24 the air is untreated outside air to cool the grain.

The heated and dried grain is dropped from bin 23 into cooling bin 24 through a funnel-shaped elongated chamber 69 which connects the bottom of the drying bin with the top of the cooling bin. In chamber 69 is disposed unloading gate 28 (FIG. 7) which is in fact comprised of a series of perforated pan-shaped gates 70 adapted to close the open ends 71 of rectangular chutes 72. Gates 70 are hinged at 73 to each chute 72 and are pivotally connected at their opposite ends 74 to individual links 75 which, in turn, are pivoted to a crank 76 secured to a shaft 77 for oscillation therewith. Said shaft is driven, in turn, from motor 39, through a crank 152 on shaft 77 connected through a link 153 and a pulley 154 driven from said motor 39. Shaft 77 may be supported in any convenient manner from drying bin 23 A continuous upwardly angled lip 151 on the edge of gates 70 helps to center the said gates with respect to the chutes 72.

The locations of the load gate assembly 27 and unload gate assembly 28 relative to the drying bin 23, are selected to insure desired grain depth for even drying and to maintain a predetermined static air pressure across the drying column, i.e., across chamber 68. Thus, load gate assembly 27 is disposed in chamber 68 not far from the top of inner wall 66 and at the bottom of long chute 53, the weight of the grain in which is relied upon to maintain a full drying bin, by supplying additional grain to make up for the shrinkage of dired grain. To insure even distribution of the grain at this location, the curved oscillating gate is used. The unload gate assembly, on the other hand, being in the deepest part of chamber 68, must be as high as possible to avoid unduly increasing the depth of the grain, and hence is located at the bottom of short chute 72. The short chute cannot accommodate an oscillating gate, and hence a flap type hinged gate is used as the unloading gate. Inasmuch as both the drying and cooling bins are of the same size, if the quantity of grain in the drying bin has been correctly determined, and there is no appreciable loss in this quantity, the quantity of grain in the cooling bin should likewise be correct to insure desired grain depth and proper static air pressure across the cooling column.

Since it is contemplated that the dryer, once started, will continue to dry automatically successive batches of grain, certain interlocks are provided in the controls for the gates to avoid useless, or out-of-phase, operation of the augers, drying bin and cooling bin. These interlocks are in the form of pressure-sensitive switches of well-known commercially available construction attached to the walls of the three bins at strategic locations so as to be operated by the pressure of grain in the bins and thus to sense the presence or absence of said grain. The grain-operated switches are connected to the controls for the augers and gates to activate or deactivate these mechanisms, as dictated by the sensed grain.

Referring now to FIG. 9, which is a schematic diagram of the bins, pressure-sensitive grain switches A–G are shown in the locations at which they are to function. Grain switch A is on the end wall 78 of the holding bin 22, below the entrance end of the load auger 25, which is the first part of the holding bin to receive grain. Upon start-up of the dryer, if grain switch A does not sense the presence of grain in a predetermined time interval after start-up, the entire dryer is deactivated. After grain has been augered into holding bin 22 for the time needed to gradually fill the bin, it will be sensed first by grain switch C, which is located on the opposite end wall 79 of bin 22 at a level corresponding to a quantity of grain which is substantially equal to a batch required to fill drying bin 23 to the correct level. Switch C thus is used to determine when load gate 27 shall open to fill the drying bin 23. Should grain switch C fail to operate, or should the drying bin 23 be full of grain, as will be shown hereinafter, grain switch B, located in wall 79 above grain switch C, will sense a higher level of grain, due to the continued operation of load auger 26, and will deactivate the load auger.

Despite the operation of grain switch C by the grain, load gate 27 will not be activated to open position unless grain, a grain switch G located just above the exit of the shows the absence of grain in the bin, to prevent the dumping of excess grain into the drying bin. When drying bin 23 is empty, however, grain will be dumped into it from holding bin 22. Just as soon as grain switch E senses the presence of the incoming grain, it initiates the operation of the heating cycle for the dryer, and when the level of the grain in the drying bin 23 reaches grain switch D, the burners and burner blowers will commence operation.

The heating cycle during which the grain is dried is controlled by a timer to be hereinafter described, and when the heating cycle has been completed as determined by the timer, the load gate 27 is closed and then the unload gate 28 is opened and the grain is dumped into cooling bin 24. If, however, cooling bin 24 is still full of grain, a grain switch G located just above the exit of the unload auger 25, in the cooling bin 24, will not allow the unload gate 28 to operate. The cooling bin must empty completely as sensed by grain switch G before the unload gate can open. As the last grain leaves the drying bin 23, grain switch E closes and initiates the closing of the unload gate system.

Certain of the functions require time for their completion and hence the grain switches may be used to activate a timer or a time delay device which, after timing out, performs the function intended by the grain switch.

A block diagram of the circuits used in the dryer is shown in FIG. 10. The main circuit for operating the various motors is a 220 v. or 440 v. circuit, whereas the switches for controlling the operation of the motors are electro-magnetically operated by a control circuit which is a 110 v. circuit. Thus a main 220 v. or 440 v. control and fuse box 80 is mounted at a convenient location on the dryer, such as in cabinet 47 or 48, and two branches are then taken from the box 80, one 81, going to the switches from the motors and the other, 82, going to a transformer 83 which reduces the voltage to 110 v. for the control circuit line 84. The switches for the motors are shown as rectangles 85, the control circuit for the drying circuit is shown as a rectangle 87 and the control circuit for the cooling circuit is shown as a rectangle 88. The drying circuit includes a primary circuit 89 for initiating the operation of the gas valve and igniter circuit and a heater circuit 90 which regulates the gas valve for maintaining a predetermined temperature in the drying bin. A manually operable purge switch 86 in series with the primary circuit 89 is used to start the fans in the drying circuit at start-up of the dryer.

The essential components of the drying circuit and their relationship are shown in FIG. 11. To simplify the showing of the circuit, the components are not shown in their entirety, but only the switch portions thereof, or those portions which are operated by the switches. For example, a motor starter coil is shown in place of a motor; the timer switch motor is not shown, but the electro-magnetic clutch which connects the motor to the timer switch is shown. The switches operated by a relay are not always shown adjacent the coil which attracts the armature to which the switches are responsive, but are shown in line with the particular sub-circuit which they control, to facilitate tracing any given sub-circuit.

Referring now to FIG. 11, the input to the drying circuit is at 91, and in series with said input is a run control relay switch 92 which is included in the heater circuit 90 and is energized when the heater for the burner is operative. Said run control relay switch acts as a safety switch to shut down the entire drying bin circuitry, should the burners for any reason fail to operate. From relay switch 92 the line goes to a manually operable stop-run switch 93 which, when closed, connects the line through one of the contacts 94 of grain switch A to the clutch 95 of a master time delay 96, the contacts of which are shown at 97 and are normally closed. Through contacts 97 the line is connected to a master control relay 98 and then to a series of normally closed switches 99, there being one for each motor used in the dryer, said switches being opened upon an overload in the circuit to any one of said motors, so that the entire dryer is rendered inoperative when any one motor is fused out.

Master control relay 98, when energized, closes contacts 101 which then connect the line through normally closed grain switch B on the holding bin 22 to the switch 171 and contact 173 of the load time delay timer 103 which is set to connect the line to contact 172 and the load auger motor 35 after a delay of approximately two minutes. The function of load time delay timer is to prevent excessive starting and stopping of the load auger as the grain settles. After this time elapses, the load auger 25 is operated to feed grain into holding bin 22, and as the grain begins to accumulate, grain switch A is operated to close contacts 100 to continue the operation of master control relay 98 and to open contacts 94 to deenergize clutch 95 and stop the operation of the master time delay 96. In the event not enough grain is augered into bin 22 to operate grain switch A, then master control time delay 96 times out and its contacts 97 are opened, thus deenergizing master control relay 98 and opening its contacts 101 to deactivate the entire dryer. Should holding bin 22 become too full, grain switch B is opened by the grain and the circuit to the load auger motor 35 is broken to stop the auger 25.

Prior to reaching the level of grain switch B, the grain in holding bin 22 will close normally-open grain switch C which, as previously stated, determines when load gate 27 shall open. Simultaneously with the closing of master control relay contacts 101 the line is connected, through normally-closed lower dryer grain switch E and reset switch 105 to the heat timer relay 106, the function of which is to initiate the heating cycle of the dryer and to terminate it after a predetermined lapse of time. This is accomplished by closing heat timer relay contacts 107 in series with the heat timer clock or motor 108, which is also in series with a left blower switch 110, a wind or sail switch 109 operated by the air stream from the left blower, a right blower switch 111 and a similar wind or sail switch 112 operated by the air stream from the right blower. Blower switches 110, 111 are closed by the relays which switch the individual blowers on.

The load gate 27 is operated by a single motor 38 (FIG. 10) the direction of which is reversed by reversing the connections to the field thereof. Hence two circuits are shown in FIG. 11, one for the starting coil 113 for the motor connection effecting an opening of loading gate 27 and one for the starting coil 114 for the motor connection effecting a closing of loading gate 27. It will be noted that starting coil 113 is in series with a limit switch 115 operated by the load gate shaft 56, said switch 115 having three pairs of contacts, and is also in series with a cam driven limit switch 116 having three pairs of contacts operated by the shaft 160 (FIGS. 7 and 13a) for the pulley 154 which drives unload gate 28.

Load gate limit switch 115 is shown in FIG. 13 and is operated by an over-center device (not shown) controlled by a shaft 154 on which are secured axially spaced divergent arms 155, 156. These arms are adapted to contact individual pins 157, 158 respectively, mounted on opposite sides of a disc 159 on shaft 56.

When load gate 27 and unload gate 28 are closed, one pair 117 of the contacts of load switch 115 is closed and one pair of contacts 118 of unload gate switch 116 is also closed. Top dryer grain switch D has two pairs of contacts, one pair 119 of which is normally closed until the dryer bin 23 is full and grain switch D is operated by the grain, and the other pair 120 is normally open. Heat timer 106 has a lower set of contacts 121 which are normally made until the timer clock 108 times out. Thus the load gate circuit is conditioned for operation to open except for the making of grain switch C and a manually operated limit switch H. Grain switch C is closed by the grain in holding bin 22 when said bin 22 is filled. The manual limit switch H, when in open position, prevents drying a subsequent batch of grain when it is determined to stop drying and cool already dried grain. With the closing of switch C, the load gate motor 38 is operated in an opening direction and the grain falls rapidly from the holding bin 22 through the chutes 53 into drying bin 23. As gates 59 reach fully open position, the contacts 117 open and the load gate motor stops. Grain continues to fall until grain switch D at the top of dryer bin 23 is operated and opens its upper contacts 119 to make sure that the load gate cannot operate to unload position again until the grain in drying bin 23 is dumped.

The operation of grain switch D closes lower contacts 120 thereof, which then complete the circuit through the heat timer clock 108 to time the drying cycle. The cycling valve circuit 122 and temperature control circuit 123 which opens cycling valve switches 124 and 125 upon opening of thermostat 126 are also rendered operative.

When the heat timer 106 times out, heat timer switch 107 is made, switch 121 is open and switch 107a is open. This breaks the circuit through the dryer blowers, as well as through the cycling valve, and also the circuit through the heat timer clock 108. The upper heat timer contacts 107 complete a circuit through load gate limit switch contacts 127 to the starter coil 114 of the load gate motor 38 and the load gate 27 is then moved to its closed position.

Meanwhile, the load gate limit switch 115 has again been operated by the load gate when it reached its closed position and contacts 115a are closed, as well as contacts 128 in series therewith on the unload gate limit switch 116 and a pair of contacts 129 which are closed by an unload time delay timer 130 shown in FIG. 12. Said timer 130 is set in motion by an electromagnetic clutch shown schematically at 131. Said clutch 131, however, is in series with grain switch G at the bottom of cooling bin 24, so that the unload gate 28 cannot be opened until all grain has left cooling bin 24, as sensed by grain switch G. With unload time delay switch 129 closed, the circuit through the unload gate motor control 132 is complete and the unload gate 28 is moved to open position at which point the limit switch contacts 128 are opened. At the same time, however, unload gate limit switch contacts 133 are closed, and the closing of the unload gate 28 is ready to begin. At this time, grain switch E is in series with limit switch contacts 133 and while drying bin 133 is emptying, switch E is open. When substantially all grain has left the drying bin, grain switch E closes and completes the circuit through the unloading gate motor control 132 to cause it to close unload gate 28. The closing of grain switch E also energizes the heat timer relay clutch 106, thus resetting the heat timer 108. The heat timer relay switches return to their normal position, and open the load gate system when the unload gate system is completely closed and grain is sensed in the holding bin 22 by grain switch C.

Referring to FIG. 12, as the dried grain fills the cooling bin 24, grain switch G opens. This disconnects the unload time delay relay 131. When cooling bin 24 is completely filled, grain switch F closes and a circuit is completed from the run control and master control relays and contacts 134 of the timer operated by the cooling clock motor clutch 135 which had been made operative when the unload time delay timer 130 made contacts 136. This operates cooling blower starters 137, 138, and as soon as the cooling blowers are operative, switches 139 and 140 are made, as are also their respective sail or wind switches 141, 142. Current now flows to the cooling clock motor 143, which determines the length of the cooling cycle.

When cooling clock motor 143 times out its predetermined setting, the switches controlled thereby are operated. These switches include a normally-made series switch 144 which opens to stop the clock motor 143, the previously mentioned normally-made contacts 134 which open to stop the cooling blowers, and normally open contacts 145 which close to operate the unload auger motor starter 146 to operate the unload auger 29. As grain leaves cooling bin 24, grain switch G is closed, thus energizing the unload time delay relay 131 which delays the connection of contacts 136 and maintains contacts 145 closed, thereby delaying the disconnection of the unload auger motor starter 146 until grain leaving the drying unit clears out of the conveying equipment from the cooling bin.

When unload time delay relay 131 times out, current is allowed to flow through the delay-relay contacts 136 to reset the cooling timer 135 which then closes contacts 129 (FIG. 11) and allows the unload gate motor 39 to open the unload gate 28 when drying is completed in drying bin 23.

It may be noted from FIG. 11 that the grain gate system is so interlocked through the limit switches that it is impossible for more than one gate operation to be performed at one time. It is also a feature of this invention that the drying unit can be stopped at any time by the operation of any of the master switches and then restarted at the same relative position it was in at the time of the shut down.

The load auger starter 25 is operative whenever the top holding bin grain switch B is closed (FIG. 11), i.e., whenever the grain level is below this switch, so that the load auger may be operating during the entire drying cycle and will stop only when the grain level in the holding bin 22 is above grain switch B.

Figure 14:
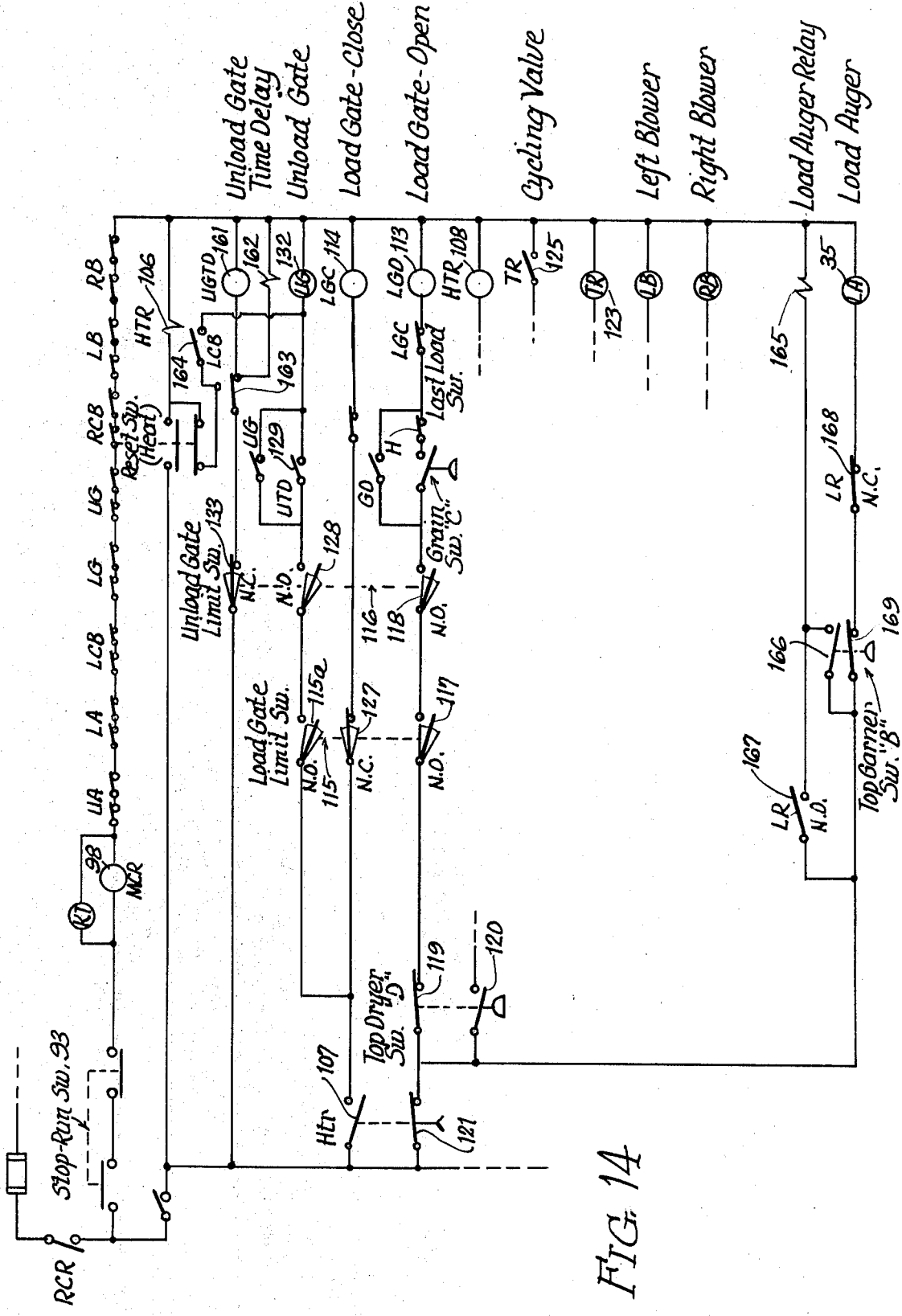
FIG. 14 is a control circuit diagram for a modification of the control circuit of FIG. 11.

Under certain conditions, it may be desirable to eliminate grain switches "A" and "E." It may be remembered that grain switch A functions to detect the presence of grain so that if the feed or load auger 25 is functioning, but no grain is being delivered to holding bin 22, due to a malfunction in the augering or grain supply, grain switch A would sense the absence of grain, and after an appropriate time interval during which this condition persisted, would shut down the entire dryer. However, it is also possible that switch A would be actuated by a very rapid emptying of holding bin 22 followed by, or during, an unusually slow filling of said bin 22 by load auger 25, so that switch A would shut the dryer down and not allow the drying bin 23 to complete its drying of the preceding batch. In the case of grain switch E, which controls the closing of the unload gates 28, unfavorable weather conditions may result in freezing or sticking of the grain in contact with the vane (not shown) by which grain switch E was operated, and thus prevent said switch E from functioning.

Where the foregoing unfavorable conditions may occure, the circuit shown in FIG. 14 may be resorted to. This circuit is essentially the same as that shown in FIG. 11, except that grain switches A and E have been eliminated. The entire circuit has not been shown, since those parts which are identical with FIG. 11 are understood to be included. In FIG. 14 it may be noted that an unload gate time delay motor 161 and its electromagnetic control 162 have replaced grain switch E so that the unload gate motor control 132 is now operated as a function of the timer 161 and the switch 163 operated thereby. Thus, after a predetermined period of time has elapsed equivalent to the time required to empty drying bin E, the unload gate will be closed in the manner described with reference to FIG. 11.

A normally open switch 164 has been added to the left cooling blower relay 137 (FIG. 12), so that when the relay is operated to start the cooling blower and thus the cooling cycle, the load gate is actuated to fill the drying bin 23.

It may also be noted in FIG. 14 that a load auger relay 165 is used which is actuated with the actuation of grain switch B. The latter, in the FIG. 14 modification, has an extra switch 166 which is made when the grain switch B is operated. With switch 166 closed, relay 165 is activated and a holding switch 167 is closed to hold relay 165 operated. At the same time, relay switch 168 in series with the load auger motor control 25 is opened to stop the auger. This condition will continue until the quantity of grain in holding bin 22 falls below grain switch B at which point relay 165 will be deactivated and heat timer clock 108 times out, thus opening switch 121, and a lower switch 169 is closed. The deactivation of relay 165 closes switch 168 to complete the circuit to load auger control 25. Thus load auger 25 will be operated only once during each heat cycle.

In the FIG. 11 form of control, the actuation of load time delay clutch 170 by grain switch B, caused switch 171 to complete a circuit through contact 173 to activate the load auger time delay 103, and when it times out, switch 171 opens the circuit through contact 173 and the time delay motor and closes the contact 172 to the load auger motor 35 to activate the load auger 25. Thus the FIG. 11 form provides means for eliminating flutter or a too rapid oscillation between on and off conditions in the load auger.

The hand operated switch H which appears in FIGS. 11 and 14 in series with grain switch C and the load gate open control may be used to halt actuation of the load gate when it is desired not to dry another batch of grain, but to finish drying grain in drying bin 23, cool this grain in cooling bin 24, and unload. Thus all undried grain will remain in holding bin 22 until it is determined to dry more grain, in which case manual switch H is closed to continue the normal drying process.

What is claimed is:

1. A gain dryer comprising a drying bin, a holding bin disposed above the drying bin, and a cooling bin disposed below the drying bin, means for filling the holding bin with grain to be dried, gate means at the bottom of the holding bin for dumping grain from the holding bin into the drying bin, gate means at the bottom of the drying bin for dumping grain from the drying bin into the cooling bin, and means for removing cooled grain from the cooling bin, said means for filling the holding bin operating at a slower rate than the rate at which the gate means at the bottom of the holding bin dumps grain into the drying bin.

2. A grain dryer as described in claim 1, both said means for filling the holding bin and said means for removing cooled grain from the cooling bin operating at a slower grain moving rate than the rate at which the gate means at the bottom of the holding bin dumps grain into the drying bin.

3. A grain dryer as described in claim 1, said means for filling the holding bin and said means for removing the cooled grain from the cooling bin comprising grain augers, the capacity to move grain of each said gate means being substantially greater than the capacity of the augers to move grain.

4. A grain dryer as described in claim 1, said drying bin having spaced inner and outer perforated walls defining a grain drying chamber of substantially constant thickness, except at its top, and said gate means at the bottom of the holding bin extending into the drying bin and being located and formed to leave a depth of grain at the top of the drying bin which is substantially equal to the said constant thickness of the drying chamber.

5. A grain dryer as described in claim 3, said gate means at the bottom of the holding bin comprising an oscillatable arcuate gate and reversible motor means for oscillating the said arcuate gate.

6. A grain dryer as described in claim 1, said drying bin having spaced inner and outer walls defining a grain drying chamber of substantially constant thickness, except at its bottom, and said gate means at the bottom of the drying bin in its closed position providing a wall which reduces the thickness of said chamber at the gate means to substantially that of the remainder of the chamber.

7. A grain dryer as described in claim 5, said gate means at the bottom of the holding bin and at the bottom of the drying bin being oscillatable between open and closed positions, an oscillatable shaft for driving the gate means at the bottom of the holding bin, switch means in proximity to said shaft, means movable with said shaft and adapted to operate said switch means at the limits of movement of said shaft in either direction of oscillation, a unidirectional power means for operating the gate means at the bottom of the drying bin, and means controlled by said switch means for controlling operation of said unidirectional power means.

8. A grain dryer as described in claim 1 and comprising further, automatically operable means for operating the gate means at the bottom of the holding and drying bins, means disposed in the holding bin and responsive to the presence of grain at a predetermined level in said holding bin to initiate the operation of the gate means at the bottom of the holding bin to dump grain therefrom as aforesaid, and manually operable means for initiating the operation of the said gate means at the bottom of the holding bin when the grain is below said predetermined level.

9. A grain dryer as described in claim 5, said gate means at the bottom of the holding bin and at the bottom of the drying bin being oscillatable, motor means for oscillating each of said gates between open and closed positions, and control means for the motor means operated by one of said gate means for preventing the opening of the other of said gate means when the said one of said gate means is open.

10. A grain dryer as described in claim 1, said dryer further comprising motor means for operating the gate means for dumping grain from the holding bin into the drying bin, and sensing means in the holding bin responsive to the pressure of a predetermined quantity of grain in the holding bin for controlling the operation of the motor means for operating the said gate means.

11. A grain dryer as described in claim 1, said dryer further comprising motor means for operating the gate means for dumping grain from the drying bin into the cooling bin, and sensing means responsive to the pressure of grain in the cooling bin for preventing operation of the motor means for operating the said gate means for dumping grain from the drying bin into the cooling bin.

12. A grain dryer as described in claim 1, said dryer further comprising motor means for operating the gate means for dumping grain from the holding bin into the drying bin, other motor means for operating the gate means for dumping grain from the drying bin into the cooling bin, sensing means in the holding, drying and cooling bins responsive the the presence of grain in said holding, drying and cooling bins and connected to control both gate means whereby to prevent operation of the motor means for the gate means for dumping grain from the holding bin into the drying bin until a predetermined quantity of grain is present in the holding bin and the drying bin is empty, and to prevent the operation of the motor means for the gate means for dumping grain from the drying bin into the cooling bin until the cooling bin is empty.

13. A grain dryer as described in claim 1, said means for filling the holding bin comprising a grain auger and means for driving said auger, said grain dryer comprising further means for supplying heated air to the drying bin, and control means responsive to the absence of grain in the holding bin for disabling the heated air supplying means.

14. A grain dryer as described in claim 1, said means for filling the holding bin comprising a grain auger, means for driving said auger, and control means for the auger driving means, said control means comprising a grain-operated switch in the holding bin disposed at a level near the top of said holding bin and adapted to disable and auger driving means when said holding bin is full.

15. A receptacle for treating granular material with a gas of predetermined characteristics, said receptacle comprising a bin having an inner continuous perforated wall of horizontal substantially cylindrical configuration, an outer perforated wall of horizontal substantially cylindrical configuration defining with the inner wall an annular material-treating chamber, a series of chutes disposed in the outer wall at the top thereof, and communicating with said chamber, gates in said chamber at the bottom of said chutes to block communication with said chamber, and means for simultaneously operating said gates selectively to open or block said chutes, said gates being cylindrical in contour and oscillatable about a common horizontal axis.

16. A receptacle as described in claim 15, a second series of chutes disposed in the outer wall at the bottom thereof and communicating with said chamber, gates exterior to said chamber at the bottoms of said second series of chutes to block communication with said chamber, said gates being hinged to move between open and closed positions with respect to said chutes, and means for simultaneously operating said gates selectively to open or block said second series of chutes.

References Cited

UNITED STATES PATENTS

| | | | |
|---|---|---|---|
| 3,056,214 | 10/1962 | Andersen | 34—56 XR |
| 3,057,080 | 10/1962 | Haddix | 34—174 |
| 3,274,699 | 9/1966 | Naylor | 34—174 XR |
| 3,406,463 | 10/1968 | Andersen | 34—56 |

FREDERICK L. MATTESON, JR., Primary Examiner

H. B. RAMEY, Assistant Examiner

U.S. Cl. X.R.

34—167, 174

UNITED STATES PATENT OFFICE
CERTIFICATE OF CORRECTION

Patent No. 3,526,969          Dated September 8, 1970

Inventor(s)   Erhard E. Alms et al.

It is certified that error appears in the above-identified patent and that said Letters Patent are hereby corrected as shown below:

Column 2, line 5, "hold" should read -- holding --; line 17, "tihs" should read -- this --. Column 3, line 58, cancel "sheets of". Column 5, line 25, "a grain switch G located ust above the exit of the" should read -- switch E, located near the bottom of drying bin 23 --; line 60, after "one" insert a comma. Column 7, line 14, after "load" insert -- gate --. Column 9, line 29, before "At" cancel the comma; line 59, "gain" should read -- grain --. Column 11, line 28, "and" should read -- the --.

Signed and sealed this 17th day of November 1970.

(SEAL)
Attest:

EDWARD M. FLETCHER, JR.                WILLIAM E. SCHUYLER, JR.
Attesting Officer                      Commissioner of Patents